(12) United States Patent
Tada et al.

(10) Patent No.: US 7,335,619 B2
(45) Date of Patent: Feb. 26, 2008

(54) CATALYST FOR FUEL ELECTRODE OF SOLID POLYMER FUEL CELL

(75) Inventors: Tomoyuki Tada, Hiratsuka (JP); Masahiko Inoue, Hiratsuka (JP); Koichi Matsutani, Hiratsuka (JP)

(73) Assignee: Tanaka Kikinzoku K.K., Tokyo (JP)

( * ) Notice: Subject to any disclaimer, the term of this patent is extended or adjusted under 35 U.S.C. 154(b) by 0 days.

(21) Appl. No.: 11/302,394

(22) Filed: Dec. 14, 2005

(65) Prior Publication Data

US 2006/0217265 A1 Sep. 28, 2006

(30) Foreign Application Priority Data

Mar. 28, 2005 (JP) .............................. 2005-091392

(51) Int. Cl.
*B01J 21/18* (2006.01)
*B01J 23/40* (2006.01)
*B01J 23/74* (2006.01)
*B01J 23/42* (2006.01)
*B01J 23/44* (2006.01)

(52) U.S. Cl. ...................... 502/185; 502/325; 502/339; 429/40; 429/44

(58) Field of Classification Search ................ 502/185, 502/326, 339, 325; 429/40, 44
See application file for complete search history.

(56) References Cited

U.S. PATENT DOCUMENTS

| 5,879,827 | A | 3/1999 | Debe et al. | |
|---|---|---|---|---|
| 6,040,077 | A * | 3/2000 | Debe et al. | 429/40 |
| 6,861,387 | B2 * | 3/2005 | Ruth et al. | 502/184 |
| 7,037,873 | B2 * | 5/2006 | Kato | 205/180 |
| 7,109,145 | B2 * | 9/2006 | Ruth et al. | 502/326 |
| 2003/0045425 | A1 * | 3/2003 | Ruth et al. | 502/325 |
| 2003/0175579 | A1 * | 9/2003 | Uchida et al. | 429/42 |
| 2004/0067847 | A1 * | 4/2004 | Kato | 502/325 |
| 2004/0157110 | A1 | 8/2004 | Knights et al. | |
| 2005/0075240 | A1 * | 4/2005 | Yamamoto | 502/101 |
| 2005/0085379 | A1 * | 4/2005 | Ishihara et al. | 502/180 |
| 2005/0101481 | A1 * | 5/2005 | Ruth et al. | 502/325 |
| 2005/0142428 | A1 * | 6/2005 | Daimon et al. | 429/40 |
| 2006/0024562 | A1 * | 2/2006 | Kashino et al. | 429/40 |
| 2006/0228603 | A1 * | 10/2006 | Daimon et al. | 429/30 |

FOREIGN PATENT DOCUMENTS

| EP | 1156543 | A2 | 11/2001 |
|---|---|---|---|
| GB | 2393848 | A | 4/2004 |
| JP | 2000-268828 | | 9/2000 |
| JP | 2004-022503 | A | 1/2004 |
| WO | 01/15247 | A2 | 3/2001 |

OTHER PUBLICATIONS

Database WPI Week 200109 Derwent Publications Ltd., London, GB; AN 2001-074207 XP002403371.

* cited by examiner

*Primary Examiner*—Cam N. Nguyen
(74) *Attorney, Agent, or Firm*—Rothwell, Figg, Ernst & Manbeck, P.C.

(57) ABSTRACT

There is provided a catalyst for a fuel electrode of a solid polymer fuel cell, wherein the catalyst comprises fine precious metal particles loaded on a support composed of an electrically conductive material, and wherein the weight ratio of the fine precious metal particles and the support composed of an electrically conductive material (fine precious metal particles:electrically conductive material) is 60:40 to 95:5; and the fine precious metal particles satisfy the following conditions (a) to (c): (a) the fine precious metal particles contain platinum and ruthenium, and the mixing ratio thereof (platinum:ruthenium) is within a range between 1:1 and 1:3 in terms of molar ratio; (b) the fine precious metal particles have an average particle diameter of 3 to 10 nm; and (c) the fine precious metal particles contain oxygen, and the weight ratio of the fine precious metal particles and oxygen (fine precious metal particles:oxygen) is 86:14 to 96:4.

3 Claims, No Drawings

CATALYST FOR FUEL ELECTRODE OF SOLID POLYMER FUEL CELL

BACKGROUND OF THE INVENTION

1. Field of the Invention

The present invention relates to a catalyst for a solid polymer fuel cell. More specifically, the present invention relates to a catalyst used for composing a fuel electrode of a solid polymer fuel cell.

2. Description of the Related Art

Fuel cells are highly expected as next-generation power generating systems, among which the use of a solid polymer fuel cell, which employs a solid polymer as an electrolyte, is promising as a power source for electric vehicles, because of a lower working temperature compared with other types of fuel cells, such as a phosphoric acid fuel cell, and of a compact size thereof.

A solid polymer fuel cell has a laminated structure consisting of two electrodes, which are a fuel electrode and an air electrode, and a solid polymer membrane sandwiched by these electrodes; supplies a fuel containing hydrogen to the fuel electrode, and oxygen or air to the air electrode; and takes out an electric power generated in each electrode by an oxidation-reduction reaction. To constitute these electrodes, a mixture of a catalyst for accelerating an electrochemical reaction and a solid polymer is generally used. As the catalyst for constituting the electrode, an electrode catalyst wherein a precious metal having a high catalytic activity is loaded on an electrically conductive material is used, and normally, fine precious metal particles with a size of 2 to 3 nm are loaded on an electrically conductive material, such as carbon, at a ratio (precious metal particles:electrically conductive material) of 90:10 to 50:50, is used.

Various properties are required to a catalyst for an electrode of a solid polymer fuel cell. To the catalyst for a fuel cell, although poisoning resistance against carbon monoxide in the fuel has been required, new problems have arisen in these years when the practical use of solid polymer fuel cells has been established. An example of these problems is a deterioration of cell properties due to fuel starvation, which can occur during the operation of a fuel cell. In the new problem, when an abnormality is caused in the fuel supply for some reasons during the normal operation of the fuel cell, the catalytic activity in the fuel cell degrades due to fuel starvation, causing the deterioration of cell properties, to thereby bringing about obstacles to the routine power supply. It has been confirmed that such lowering of catalytic activity due to fuel starvation is irreversible, and even if the fuel is supplied again, the catalytic activity cannot be completely restored.

Here, it can be said that a countermeasure to address the problem of irreversible inactivation of the catalyst is to establish the system wherein fuel supply is not stopped. However, even if the improvement of such a peripheral system is feasible, it is preferable to drastically improve the fuel electrode and catalyst considering in case of emergency.

Related to the problem of fuel starvation, as a countermeasure for a fuel cell catalyst heretofore studied, for example, the addition of ruthenium oxide ($RuO_2$) or iridium oxide ($IrO_2$) to the catalyst layer has been known. As another improving method, it has been known to be effective to use a support that is stable to oxidation properties, such as graphite carbon and titanium oxide ($Ti_4O_7$), and to increase the loading of catalyst particles (refer to International Patent Laid-Open Nos. WO01/15247 and WO01/15254).

The present inventors have proposed a method for solving the problem of fuel starvation in view of the improvement of an electrode structure. The electrode has a multilayer structure composed of a reaction layer that proceeds the fuel cell reaction, and a water decomposing layer that electrolyzes water in the fuel electrode (refer to Japanese Patent Application Laid-Open No. 2004-22503).

According to the examinations by the present inventors, a prima-facie effect can be seen in the above-described various countermeasures. However, the former improvement of the catalyst is not necessarily sufficient, and indispensable deterioration in properties is seen in fuel starvation. Although the above-described improvement of the electrode is effective, it can be said that the catalyst itself is improved to make the technique more effective.

The present invention has been made in the above-described background, and an object of the present invention is to provide a catalyst for a fuel electrode of a solid polymer fuel cell that has been more effectively improved in view of fuel starvation, and is difficult to cause the deterioration of catalyst activity even if fuel starvation occurs.

SUMMARY OF THE INVENTION

The present inventors examined the factors to lower the activity of a catalyst when fuel starvation occurred in Japanese Patent Laid-Open Application No. 2004-22503. In the examinations, it is described that catalyst inactivation in fuel starvation relates to the occurrence of change in the dominating reaction in the fuel electrode. To the fuel electrode in the state wherein the fuel is normally supplied, protons formed by the electrolysis of hydrogen are supplied, which become the source of electric power generation. Specifically, in the fuel electrode, the decomposition reaction of hydrogen atoms is normally dominative, and the potential of the fuel electrode at this time is approximated to 0 V (based on hydrogen electrode). On the other hand, when fuel starvation occurs, a reaction to electrolyze water occurs for replenishing deficient protons in the fuel electrode, and this reaction becomes dominative. The potential of the electrolysis of water is 1.23 V (based on hydrogen electrode), from which it is considered that fuel starvation elevates the potential of the fuel electrode. The present inventors considered that the decrease in activity was caused by some sort of change in the fuel electrode catalyst by such a change in the environment of the fuel electrode (potential elevation). In examination described in Japanese Patent Application Laid-Open No. 2004-22503, the present inventors considered that some sort of film was irreversibly formed on the surface of the catalyst as a change that occurred in the catalyst due to potential elevation, and this lowered the activity of the catalyst.

In completing the present invention, the present inventors considered, as another factor to decreased activity due to fuel starvation in addition to the above-described formation of the film, that material deterioration occurred in the electrically conductive material to compose the electrode during voltage elevation, which in turn caused the deterioration of the electrode structure, leading to the decrease in activity. It is considered that this deterioration of the electrode structure is also irreversible, and even if the fuel is normally supplied after fuel starvation (after the deterioration of the structure), the structure cannot be restored.

Therefore, the present inventors considered from these examinations that in order to provide a catalyst free from decreased activity even if fuel starvation occurred, it is preferable to develop a catalyst difficult to form a film due to potential elevation, and difficult to cause the deterioration of the electrode structure. Thus, the present invention has been completed as a result of keen examinations, by (1) specifying the range of loading of precious metal particles; (2) while determining the precious metal particles as those containing both platinum and ruthenium, making the compounding ratios within a predetermined range; and (3) by clarifying the particle diameters thereof and the favorable ranges of oxygen content in the precious metal particles.

Specifically, the present invention is a catalyst for the fuel electrode of a solid polymer fuel cell, wherein the catalyst comprises fine precious metal particles loaded on a support composed of an electrically conductive material, and wherein the weight ratio of the fine precious metal particles and the support composed of an electrically conductive material (fine precious metal particles:electrically conductive material) is 60:40 to 95:5; and the fine precious metal particles satisfy the following conditions (a) to (c):

(a) the fine precious metal particles contain platinum and ruthenium, and the mixing ratio thereof (platinum:ruthenium) is within a range between 1:1 and 1:3 in terms of molar ratio;

(b) the fine precious metal particles have an average particle diameter of 3 to 10 nm; and (c) the fine precious metal particles contain oxygen, and the weight ratio of the fine precious metal particles and oxygen (fine precious metal particles:oxygen) is 86:14 to 96:4.

The present invention will be described below. The catalyst according to the present invention is characterized by the loading of precious metal particles and the composition of the precious metal particles.

Concerning the loading of precious metal particles, the weight ratio (precious metal particles: electrically conductive material) must be 60:40 to 95:5. The range of loading of precious metal particles is in a higher loading side than the weight ratio (precious metal particles:electrically conductive material=90:10 to 50:50) in the quantity of precious metal particles in conventional electrode catalysts described above. The reason why the loading of precious metal particles is increased is that although the deterioration of the electrode structure is caused by the deterioration of the electrically conductive material, the effect to the change in the electrode structure can be reduced by lowering the quantity of the electrically conductive material (ratio to the electrode). The reason why the loading of precious metal particles is determined to be within such a quantity range is that if the precious metal particles are loaded at a ratio lower than 60:40, the quantity of the electrically conductive material is large, and the deterioration of the electrode in fuel starvation cannot be negligible; and if the precious metal particles are loaded at a ratio higher than 95:5, the dispersibility of the precious metal particles is lowered, and there are unfavorable aspects in the electrode configuration. From such a point of view, the preferable loading is 70:30 to 90:10.

On the other hand, the composition of precious metal particles is determined by three factors of (a) the components and ratio thereof, (b) the average particle diameter, and (c) the oxygen content.

First, the components of the precious metal particles (a) are platinum and ruthenium, and the compounding ratio (platinum:ruthenium) must be within a range between 1:1 and 1:3 in molar ratios. Although ruthenium has been known as a component to improve the poisoning of carbon monoxide resistant catalysts, the present invention focuses on the effect to suppressing film formation on potential elevation as a more important effect than the above-described effect. If ruthenium if compounded in a platinum/ruthenium ratio is lower than 1:1 the effect of ruthenium compounding cannot be exerted, and the decrease in activity due to fuel starvation is observed. On the other hand, since the actual promotion of the fuel-cell reaction is caused by platinum, if ruthenium is loaded at a ratio exceeding 1:3, the loading of platinum is decreased, regardless of the presence of fuel starvation, and the characteristics of the catalyst itself is deteriorated. From such a point of view, the more preferable compounding ratio is 1:1 to 1:2.

The average particle diameter (b) of the precious metal particles is preferably 3 to 10 nm. The particle diameter of the precious metal particles is larger than the particle diameter of the precious metal particles in conventional electrode catalysts (2 to 3 nm). Although the reason why the particle diameter of the precious metal particles in enlarged has not been clarified, the film formation on potential elevation can be suppressed by enlarging the particle diameter. If the particle diameter of the precious metal particles is less than 3 nm, film formation on the surfaces of the particles cannot be suppressed, and if it exceeds 10 nm, the reactivity of the catalyst itself lowers. The preferable range of the average diameter of the precious metal particles is 4 to 7 nm.

The precious metal particles loaded in the catalyst according to the present invention must contain oxygen, and the weight ratio of the precious metal particles and oxygen (precious metal particles to oxygen) must be 86:14 to 96:4 (c). The quantity of oxygen in the precious metal particles also relates to the suppressing effect of film formation on potential elevation. The reason why the oxygen content of the precious metal particles is determined to be within such a quantity range is that if the oxygen content is lower than 96:4, the effect of suppressing film formation is lowered, and it is difficult to control the particle diameter of the precious metal particles to be 3 to 10 nm. On the other hand, if the oxygen content exceeds 86:14, the effect of suppressing film formation is also lowered, and the activity as the catalyst itself is lowered. From such a point of view, the preferable oxygen quantity is 89:11 to 93:7.

As described above, the precious metal particles in the present invention are specified by composition, average particle diameter, and oxygen content, and these three factors are contingent upon being within predetermined ranges. By combining these factors, the durability of the catalyst against the fuel starvation can be improved.

In the catalyst for a fuel electrode according to the present invention, an electrically conductive material to be a support is preferably a carbon material having a specific surface area of 10 to 1000 m$^2$/g. Especially, the specific surface area of the carbon material is preferably 10 to 300 m$^2$/g, and the lattice spacing $d_{002}$ of the (002) face thereof is 0.334 to 0.348 Å. The reason why a preferable range is present for the characteristics of the electrically conductive material is that the performance deterioration of catalyst in fuel starvation relates to the structural deterioration of the electrically conductive material. However, making the characteristics of the electrically conductive material within the above-described range is not essential to suppress decrease in activity in fuel starvation. Specifically, even if the characteristics of the support are beyond the above-described range, decrease in activity can be suppressed by controlling the loading of the precious metal particles and the composition of the precious metal particles to be within proper ranges.

The catalyst according to the present invention is produced by loading platinum and ruthenium constituting the precious metal particles on a support in a predetermined ratio. In these steps, there are no specific limitations in the step for loading platinum and ruthenium on the support. Specifically, as in conventional methods, platinum and ruthenium can be loaded at a desired ratio by impregnating the support with a solution of a platinum salt and a solution of a ruthenium salt according to the composition of the precious metal particles. The order in which platinum and ruthenium are loaded has no particular effect, whether either of them is first loaded or they are simultaneously loaded.

The particle diameter and oxygen content of the precious metal particles can be controlled by the pH range of the solutions, the heating and drying methods, and heat treatment conditions when the catalyst is prepared. The lattice spacing of the electrically conductive material, which is the support, can be controlled within a preferable range by sintering the electrically conductive material, such as carbon, at a high temperature of 2000° C. or above.

The catalyst of the fuel electrode of a solid polymer fuel cell according to the present invention can function without lowering the activity thereof even if fuel starvation occurs during the operation of the fuel cell. Therefore, the electrode manufactured from the catalyst according to the present invention excels in durability against fuel starvation as the fuel electrode of the solid polymer fuel cell, and is useful for the stable operation of the solid polymer fuel cell.

In a solid polymer fuel cell to which the present invention is applied, there are no specific limitations in the fuel to be supplied. Specifically, pure hydrogen can be applied, or reformed hydrogen manufactured from natural gas or the like can also be applied. However, the catalyst according to the present invention exerts a significant effect in the operation of a fuel cell utilizing pure hydrogen. In this aspect, although ruthenium is said to be effective for only the problem of carbon monoxide poisoning in conventional platinum-ruthenium catalyst, an effect absolutely different from the effect to the improvement of resistance against carbon monoxide poisoning has been found in the present invention, and the usefulness in the operation utilizing pure hydrogen (carbon monoxide free) has also been confirmed.

DETAILED DESCRIPTION OF THE PREFERRED EMBODIMENTS

The preferred embodiments of the present invention will be described below. In these embodiments, platinum/ruthenium alloy catalysts widely different in precious metal loading, precious metal particle composition, precious metal oxygen content, and support property were manufactured; and the properties thereof were checked. The basic process for manufacturing the catalyst is as follows:

First, a chloroplatinic acid solution, a ruthenium chloride solution, and carbon powder to be a support were mixed with water, and agitated. The mixture was heated and controlled at around 80° C., and sodium hydroxide was added to adjust pH at 6 to 8. After cooling the solution, hydrazine or sodium borohydride was added as a reducing agent, and precious metal particles were deposited on carbon, and then filtered and dried to be a catalyst.

In the above basic processes, a plurality of kinds of carbon powders having different thermal histories, specific surface areas, and lattice plane spacing $d_{002}$ were used as supports, depending on the purposes of examinations. The loading of precious metal particles and the mixing ratio of platinum and ruthenium were controlled by adjusting the concentrations of the chloroplatinic acid solution and the ruthenium chloride solution (platinum concentration and ruthenium concentration), and the concentration of carbon particles. Furthermore, the average particle diameter of the precious metal particles was controlled by the pH value when sodium hydroxide was added. The manufactured catalyst was heat-treated in hydrogen to variously adjust oxygen contents.

In these embodiments, catalysts having different characteristics of precious metal particles (mixing ratio of platinum and ruthenium, particle diameter, and oxygen quantity), and different precious metal loading were manufactured on the basis of the above-described method; and electrodes were fabricated with the use of these catalysts and the characteristics of these electrodes were examined. The procedures for fabricating the electrodes were as follows: To 1.2 g of the resin powder produced by spray-drying a 5% solution of an ion-exchange resin (trade name: Nafion®, manufactured by Du Pont K.K.), 1 g of the catalyst weighed on the basis of carbon powder was mixed, these were poured into 25 ml of a mixed solution of 1-propanol and water, and were mixed in a ball mill for 50 minutes to form a catalyst paste. A sheet of carbon paper impregnated with PTFE wherein the surface layer was coated with carbon and the ion-exchange resin was used as a gas diffusion layer, and the above-described catalyst paste was applied and printed onto the carbon paper so that the platinum quantity became 0.56 mg/cm². Furthermore, after drying it at 60° C., it was compressed at 130° C. under a pressure of 20 kg/cm² for 1 minute to fabricate an electrode.

The method for examining electrode characteristics is as follows: Using the fabricated electrode, a half cell was manufactured. Here, sulfuric acid was used as an electrolyte, platinum mesh was used as a counter electrode, a standard hydrogen electrode was used as a reference electrode, the fabricated electrode was used as working electrode, a fuel was supplied to it to flow a current, and after measuring the polarization value (oxidation activity overvoltage of hydrogen) at a current density of 500 mA/cm², fuel supply was stopped, and in this state, a current of 200 mA/cm² was flowed for 20 minutes (10 minutes only for the examination related to oxygen content) (fuel starvation simulated operation). Then, the fuel was supplied again to the electrode after fuel starvation simulated operation, and by measuring the polarization value at a current density of 500 mA/cm², the presence of electrode performance deterioration after fuel starvation simulated operation was examined. The test conditions of the above test were as follows:

Electrode area: 7 cm²

Temperature: 60° C.

Fuel: 100% Hydrogen

EXAMPLE 1

Examination of Precious Metal Particle Loading

First, the electrode characteristics of catalysts having different loadings of precious metal particles were examined. The support used here was carbon powder of a specific surface area of 130 m²/g, and a lattice face spacing $d_{002}$ of 0.344 Å. The mixing ratio of platinum and ruthenium was 1:1, and the oxygen content (weight ratio of precious metal particles to oxygen) was 92:8. Table 1 shows the results of the examinations.

TABLE 1

| Percent loading of precious metal | Oxidative activation overpotential of hydrogen (mv) | |
|---|---|---|
| | Before fuel starvation | After fuel starvation |
| 90 wt % (precious metal:support = 90:10) | 3.5 | 5 |
| 80 wt % (precious metal:support = 80:20) | 4.5 | 6.5 |
| 70 wt % (precious metal:support = 70:30) | 6 | 5.5 |
| 60 wt % (precious metal:support = 60:40) | 4.5 | 4 |
| 50 wt % (precious metal:support = 50:50) | 4.5 | 43 |

As can be seen from Table 1, the percent loading of precious metal does not significantly affect the initial activity (before fuel starvation). However, in catalysts having a loading rate of 50% by weight, which is lower than 60% by weight, it was confirmed that the activity after fuel starvation lowered. In catalysts having a loading rate of 60 to 90% by weight, no decrease in activities was observed even fuel starvation occurred.

EXAMPLE 2

Examination of Precious Metal Particle Composition

Here, the electrode characteristics of catalysts having precious metal particles loaded at different mixing ratios of platinum and ruthenium were examined. The support used here was carbon powder of a specific surface area of 800 $m^2/g$, and a lattice face spacing $d_{002}$ of 0.355 Å. The loading of precious metal particles was 90% by weight (precious metal particles: support=90:10), and the oxygen content (weight ratio of precious metal particles to oxygen) was within a range between 95:5 and 89:11. Table 2 shows the results of the examinations.

TABLE 2

| Mixing ratio | Oxidative activation overpotential of hydrogen (mv) | |
|---|---|---|
| | Before fuel starvation | After fuel starvation |
| Pt:Ru = 1:0 | 5 | 207 |
| Pt:Ru = 1:0.5 | 4 | 54.5 |
| Pt:Ru = 1:1 | 6 | 7 |
| Pt:Ru = 1:1.5 | 5 | 5.5 |
| Pt:Ru = 1:2 | 3.5 | 5.5 |

As can be seen from Table 2, although these catalysts exhibited substantially the same activities before fuel starvation, the activities of catalysts having ruthenium loaded at mixing ratios lower than 1:1 were significantly decreased after fuel starvation. Whereas, in catalysts having mixing ratios of 1:1 to 1:2, no decrease in activity was observed even fuel starvation occurred.

EXAMPLE 3

Examination of Oxygen Content in Precious Metal Particles

Here, the electrode characteristics of catalysts having loaded precious metal particles having an oxygen content of 1% by weight (weight of precious metal particles:weight of oxygen=99:1) or less, and catalysts having loaded precious metal particles having an oxygen content of 7% by weight (weight of precious metal particles:weight of oxygen=93:7) were examined. The support used here was carbon powder of a specific surface area of 800 $m^2/g$, and a lattice face spacing $d_{002}$ of 0.355 Å. The loading of precious metal particles was 70% by weight (precious metal particles: support=70:30), and the mixing ratio of platinum and ruthenium was 1:1. Table 3 shows the results of the examinations.

TABLE 3

| Oxygen content | Oxidative activation overpotential of hydrogen (mv) | |
|---|---|---|
| | Before fuel starvation | After fuel starvation |
| 1% by weight or less | 3 | 45 |
| 7% by weight | 6.5 | 2 |

As can be seen from Table 3, although the decrease in activity was observed by fuel starvation in the catalyst having an oxygen content of 1% by weight or less, it was confirmed that an effect to suppress the decrease in activities was obtained by increasing the oxygen content to 7% by weight.

EXAMPLE 4

Examination of Support Characteristics

The catalysts were evaluated in each Examples 1 to 3 contained either one of two kinds of carbon powders as the support, one having a specific surface area of 130 $m^2/g$ and a lattice face spacing $d_{002}$ of 0.344 Å, and the other having a specific surface area of 800 $m^2/g$ and a lattice face spacing $d_{002}$ of 0.355 Å, on which platinum and ruthenium were loaded. Here, catalysts using further two kinds of supports were examined. The precious metal particle loading of each of these catalysts was 80% by weight (precious metal particles: support=80:20) the mixing ratio of platinum and ruthenium was 1:1, and the oxygen content (weight ratio of precious metal particles to oxygen) was 92:8. Table 4 shows the results of the examinations.

TABLE 4

| Support characteristics | | Oxidative activation overpotential of hydrogen (mv) | |
|---|---|---|---|
| Specific surface area | $d_{002}$ | Before fuel starvation | After fuel starvation |
| 270 $m^2/g$ | 0.335 Å | 7.5 | 6 |
| 20 $m^2/g$ | 0.345 Å | 5 | 5.5 |

From Table 4, it was confirmed that even when other supports were used, no decrease in activity due to fuel starvation was observed, and that favorable activity was exhibited. As described above, in order to suppress decrease in activity due to fuel starvation, the characteristics of the support is not necessarily prioritized. This is obvious from the fact that the effect to suppress decreased activity is shown in Examples 1 to 3 by controlling the quantities and compositions of precious metal particles within an appropriate range, even if supports having different properties, such as a specific surface area of 130 m$^2$/g and a lattice face spacing d$_{002}$ of 0.344 Å, and a specific surface area of 800 m$^2$/g and a lattice face spacing d$_{002}$ of 0.355 Å are used.

What is claimed is:

1. A catalyst for the fuel electrode of a solid polymer fuel cell, wherein the catalyst comprises fine precious metal particles loaded on a support composed of an electrically conductive material, wherein:

a weight ratio of said fine precious metal particles and said support composed of an electrically conductive material (fine precious metal particles:electrically conductive material) is 60:40 to 95:5; and said fine precious metal particles satisfy the following conditions (a) to (c):

(a) the fine precious metal particles contain platinum and ruthenium, and the mixing ratio thereof (platinum:ruthenium) is within a range between 1:1 and 1:3 in terms of molar ratio;

(b) the fine precious metal particles have an average particle diameter of 3 to 10 nm; and (c) the fine precious metal particles contain oxygen, and the weight ratio of the fine precious metal particles and oxygen (fine precious metal particles:oxygen) is 86:14 to 93:7.

2. The catalyst for the fuel electrode of a solid polymer fuel cell according to claim 1, wherein the electrically conductive material is a carbon material, and the specific surface area thereof is 10 to 1000 m$^2$/g.

3. The catalyst for the fuel electrode of a solid polymer fuel cell according to claim 1, wherein the electrically conductive material is a carbon material and the specific surface area thereof is 10 to 300 m$^2$/g.

* * * * *